United States Patent
Yang (10) Patent No.: US 8,782,181 B2
(45) Date of Patent: Jul. 15, 2014

(54) METHOD AND SYSTEM FOR UPGRADING NETWORK DEVICE

(75) Inventor: Yang Yang, Shenzhen (CN)

(73) Assignee: ZTE Corporation, Shenzhen (CN)

(*) Notice: Subject to any disclaimer, the term of this patent is extended or adjusted under 35 U.S.C. 154(b) by 218 days.

(21) Appl. No.: 13/580,154

(22) PCT Filed: Nov. 15, 2010

(86) PCT No.: PCT/CN2010/078730
§ 371 (c)(1),
(2), (4) Date: Aug. 21, 2012

(87) PCT Pub. No.: WO2011/110030
PCT Pub. Date: Sep. 15, 2011

(65) Prior Publication Data
US 2012/0324065 A1    Dec. 20, 2012

(30) Foreign Application Priority Data

Mar. 8, 2010 (CN) .......................... 2010 1 0119435

(51) Int. Cl.
G06F 15/177 (2006.01)
G06F 9/445 (2006.01)
H04L 12/24 (2006.01)
H04L 29/08 (2006.01)

(52) U.S. Cl.
CPC .............. *G06F 8/65* (2013.01); *H04L 41/0813* (2013.01); *H04L 41/0806* (2013.01); *H04L 41/082* (2013.01); *H04L 67/34* (2013.01)
USPC ............................ 709/220; 709/221; 709/222

(58) Field of Classification Search
CPC .............. H04L 41/0813; H04L 41/082; H04L 41/0806
USPC .................................................. 709/220–222
See application file for complete search history.

(56) References Cited

U.S. PATENT DOCUMENTS

2002/0001307 A1* 1/2002 Nguyen et al. ................ 370/386
2002/0116485 A1* 8/2002 Black et al. ................... 709/223
(Continued)

FOREIGN PATENT DOCUMENTS

| CN | 1617496 A | 5/2005 |
| CN | 1658574 A | 8/2005 |

(Continued)

OTHER PUBLICATIONS

International Search Report in international application No. PCT/CN2010/078730, mailed on Feb. 24, 2011.

(Continued)

*Primary Examiner* — Hieu Hoang
(74) *Attorney, Agent, or Firm* — Oppedahl Patent Law Firm LLC (57) ABSTRACT

The disclosure discloses a method for upgrading a network device, which comprises: establishing, by a network management server, a Transmission Control Protocol (TCP) connection with the network device (101); during an upgrade process, transmitting, by the network management server, a private protocol born on the TCP to the network device to notify the network device to be upgraded, then executing, by the network device, a corresponding upgrade operation after receiving the notification and returning an upgrade result to the network management server through the private protocol born on the TCP (102). The disclosure also discloses a system for upgrading a network device. With the method and the system, the purpose of implementing automatic upgrade for a network device can be achieved without a third party and the implementation is simple.

16 Claims, 3 Drawing Sheets

(56) References Cited

U.S. PATENT DOCUMENTS

| | | |
|---|---|---|
| 2003/0126195 A1* | 7/2003 | Reynolds et al. ............. 709/203 |
| 2003/0182362 A1* | 9/2003 | Jensen et al. ................. 709/203 |
| 2004/0031030 A1* | 2/2004 | Kidder et al. ................. 717/172 |
| 2005/0185607 A1* | 8/2005 | Svensson et al. ............. 370/328 |
| 2006/0123103 A1 | 6/2006 | Shankar et al. |
| 2007/0118617 A1* | 5/2007 | Lee et al. ...................... 709/219 |
| 2008/0072291 A1 | 3/2008 | Carley |
| 2008/0232273 A1* | 9/2008 | Beckett et al. ................ 370/254 |

FOREIGN PATENT DOCUMENTS

| | | |
|---|---|---|
| CN | 1819557 A | 8/2006 |
| CN | 101030146 A | 9/2007 |
| CN | 101046873 A | 10/2007 |
| CN | 101222363 A | 7/2008 |
| CN | 101237382 A | 8/2008 |
| CN | 101316189 A | 12/2008 |
| CN | 101442688 A | 5/2009 |
| CN | 101621437 A | 1/2010 |
| CN | 101808009 A | 8/2010 |
| WO | 2010022100 A2 | 2/2010 |

OTHER PUBLICATIONS

English Translation of the Written Opinion of the International Search Authority in international application No. PCT/CN2010/078730, mailed on Feb. 24, 2011.

* cited by examiner

METHOD AND SYSTEM FOR UPGRADING NETWORK DEVICE

TECHNICAL FIELD

The disclosure relates to a technology of upgrading a network device in the field of communications, particularly to a method and system for upgrading a network device.

BACKGROUND

In the conventional planning and deployment process of a network, lots of network devices need to be configured manually one by one before entering a network, and the following version upgrade process of the network device is completed through manual configuration too; therefore, a large amount of labor force is consumed during the configuration process; in addition, since the deployment process of the network is complex, it is easy to make a mistake during the manual configuration. Thus, an upgrade method which is easy to implement and provides an accurate configuration is needed in the deployment process of a network.

At present, a method for automatically upgrading a network device has been is proposed to achieve the purpose of accurate configuration, for example, a network management server completes, through a dedicated channel established between each network device and a switch, an upgrade operation of a corresponding network device, namely, before the upgrade, the network device first establishes with the switch the dedicated channel used for the following upgrade of the network device, then the network management server implements the upgrade management of the network device through the dedicated channel. Although this automatic upgrade method can avoid the operation of manual configuration and improve the efficiency of upgrade, it is needed to rely on a third party, that is, the switch, to complete the upgrade operation of a network device; therefore, when a network management server performs the upgrade management of a network device, it is needed to complete an extra configuration of a third party, thus the cost is relatively high and the implementation process is tedious.

SUMMARY

In view of the problems above, the main purpose of the disclosure is to provide a method and system for upgrading a network device, which can achieve the purpose of implementing automatic upgrade for the network device without a third party and can be easy to implement.

In order to achieve the purpose above, the technical solution of the disclosure is realized as follows.

The disclosure provides a method for upgrading a network device, which comprises: establishing, by a network management server, a Transmission Control Protocol (TCP) connection with the network device;

during an upgrade process, transmitting, by the network management server, a private protocol born on the TCP to the network device to notify the network device to be upgraded; executing, by the network device, a corresponding upgrade operation after receiving the notification and returning an upgrade result to the network management server through the private protocol born on the TCP.

The process of the network management server and the network device performing an upgrade by using the private protocol born on the TCP may comprise:

step A: transmitting, by the network device, device information of the network device itself to the network management server;

step B: judging, by the network management server, the device information transmitted from the network device and transmitting upgrade information corresponding to the judgment result to notify the network device to be upgraded;

step C: executing, by the network device, a corresponding upgrade operation after receiving the upgrade information and feeding back an upgrade result to the network management server.

The step B may comprise: judging, by the network management server, the device information transmitted from the network device, notifying the network device to interrupt the TCP connection when determining that the network device is illegal, notifying the network device to download version files when determining that both version and configuration of the network device need an upgrade, and notifying the network device to directly download profiles when determining that the version of the network device needs no upgrade but the configuration needs an upgrade;

the step C may comprise: when receiving the notification from the network management server of downloading version files, downloading, by the network device, the version files and returning a download result to the network management server; notifying, by the network management server, the network device to restart, then executing, by the network device, a restart operation after receiving the notification and notifying the network management server after the restart; when receiving the notification from the network management server of downloading profiles, downloading, by the network device, the profiles and returning a download result to the network management server; notifying, by the network management server, the network device to upgrade the downloaded profiles, then upgrading, by the network device, the profiles after receiving the notification and returning an upgrade result to the network is management server.

The upgrade mode of the network device upgrading profiles notified by the network management server may comprise: upgrade immediately and upgrade regularly;

when the upgrade mode is upgrade immediately, after the network device returns the upgrade result of the profiles to the network management server, the method may further comprise:

notifying, by the network management server, the network device to upload log files, then uploading, by the network device, the log files after receiving the notification and transmitting an upload result to the network management server.

The method may further comprise: after the network device completes the upgrade, notifying, by the network management server, the network device to interrupt the TCP connection there-between through the private protocol born on the TCP; executing, by the network device, a disconnection operation of the TCP connection after receiving the notification.

The method may further comprise: during the upgrade process of the network device, regularly reporting, by the network device, the upgrade progress of the network device itself to the network management server through the private protocol born on the TCP.

The disclosure also provides a system for upgrading a network device, which comprises: a network management server and a network device;

the network management server is configured to: establish a TCP connection with the network device; during an upgrade process, transmit a private protocol born on the TCP to the network device to notify the network device to be upgraded; and receive an upgrade result of the execution of an upgrade operation returned by the network device through the private protocol born on the TCP;

the network device is configured to: establish a TCP connection with the network management server; during an upgrade process, after receiving an upgrade notification transmitted from the network management server through the private is protocol born on the TCP, execute a corresponding upgrade operation and return an upgrade result to the network management server through the private protocol born on the TCP.

The upgrade process in which the network management server performs communications with the network device by using the private protocol born on the TCP may comprise: the network management server receives and judges device information transmitted from the network device, transmits upgrade information corresponding to the judgment result to notify the network device to be upgraded, and receives an upgrade result fed back by the network device; and the upgrade process in which the network device performs communications with the network management server by using the private protocol born on the TCP may comprise: the network device transmits device information of the network device itself to the network management server, executes a corresponding upgrade operation after receiving upgrade information transmitted from the network management server and feeds back an upgrade result to the network management server.

The network management server judging the device information transmitted from the network device, notifying the network device to be upgraded and receiving the upgrade result fed back by the network device may comprise:

judging the device information transmitted from the network device, notifying the network device to interrupt the TCP connection when determining that the network device is illegal; notifying the network device to download version files when determining that both version and configuration of the network device need an upgrade; notifying the network device to directly download profiles when determining that the version of the network device needs no upgrade but the configuration needs an upgrade; notifying the network device to restart after receiving a download result of the version files transmitted from the network device, and receiving a restart complete result reported by the network device; notifying the network device to upgrade the downloaded profiles after receiving a download result of the profiles transmitted from the network device, and receiving an upgrade result of the profiles returned by the network is device; and the network device executing the upgrade operation and feeding back the upgrade result to the network management server may comprise:

after being determined to be illegal by the network management server and receiving a notification of interrupting the TCP connection, interrupting the TCP connection with the network management server; after receiving the notification from the network management server, downloading version files or downloading profiles, and returning a download result to the network management server; after receiving the notification from the network management server, restarting and notifying the network management server after the restart; and after receiving the notification from the network management server, upgrading the profiles and returning an upgrade result to the network management server.

The upgrade mode of the network device upgrading profiles notified by the network management server may comprise: upgrade immediately and upgrade regularly;

when the upgrade mode is upgrade immediately, preferably, the network management server may be configured to notify the network device to upload log files after receiving the upgrade result of the profiles transmitted from the network device and to receive an upload result of the log files transmitted from the network device; and the network device may be configured to upload the log files after receiving the notification transmitted from the network management server and to transmit the upload result to the network management server.

Preferably, the network management server may be configured to notify, after the network device completes the upgrade, the network device to interrupt the TCP connection there-between through the private protocol born on the TCP; and the network device may be configured to execute a disconnection operation of the TCP connection after receiving the notification transmitted from the network management server.

Preferably, the network device may be configured to regularly report the upgrade is progress of the network device itself to the network management server through the private protocol born on the TCP, during the upgrade process; and the network management server may be configured to receive the upgrade progress transmitted from the network device.

In the method and system for upgrading a network device according to the disclosure, the network management server and the network device establish a TCP connection; during the upgrade process, the network management server transmits a private protocol born on the TCP to the network device to notify the network device to be upgraded, then the network device executes a corresponding upgrade operation after receiving the notification and returns a corresponding upgrade result to the network management server through the private protocol born on the TCP. Before the network device upgrades in the disclosure, a TCP connection is established between the network management server and the network device; during the upgrade process, both the network management server and the network device adopt the private protocol born on the TCP to perform communication with each other, so as to implement the management of an upgrade operation of the network device by the network management server. In the disclosure, the network device completes the entire upgrade process only under the management of the network management server, without the assistance of a third party, that is, no extra configuration of a third party is needed; the method is simple to implement and the cost is saved.

DETAILED DESCRIPTION

The basic idea of the disclosure is that: a network management server establishes a TCP connection with a network device; during an upgrade process, the network management server transmits a private protocol born on the TCP to the network device to notify the network device to be upgraded, then the network device executes a corresponding upgrade operation after receiving the notification and returns an upgrade result to the network management server through the private protocol born on the TCP.

Further, after the network device completes the upgrade, the network management server notifies the network device to interrupt the TCP connection there-between through the private protocol born on the TCP, then the network device executes a disconnection operation of the TCP connection after receiving the notification;

wherein the private protocol includes a plurality of message types, which are respectively used for the network management server and the network device performing communications in different upgrade phases; the private protocol born on the TCP is: a private protocol is encapsulated by TCP and then transmitted by the TCP connection between the network management server and the network device.

The disclosure is described below in detail in conjunction with the drawings and specific embodiments.

Figure 1:
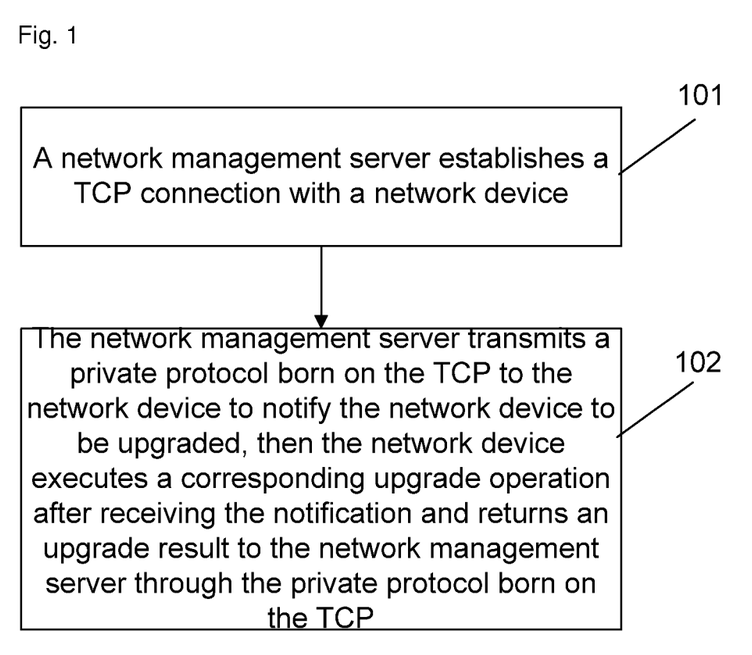
FIG. 1 shows an implementation flowchart of a method for upgrading a network device of the disclosure.

FIG. 1 shows an implementation flowchart of a method for upgrading a network device of the disclosure; as shown in FIG. 1, the process comprises the following implementation steps:

Step 101: a network management server establishes a TCP connection with a network device.

Specifically, after the network device is started, the network device automatically starts a Dynamic Host Configuration Protocol (DHCP) client service function and acquires, from a DHCP server at the network side, a target IP address and a port number of the network management server needed by establishing the TCP connection, then the network device and the network management server establish the TCP connection is there-between.

Here, the process of establishing the TCP connection is a conventional art, and no further description is needed here.

In the disclosure, after establishing the TCP connection between the network device and the network management server, both the network device and the network management server perform communications there-between by using the private protocol born on the TCP in the following upgrade process; the network management server can manage a plurality of network devices simultaneously.

Step 102: during an upgrade process, the network management server transmits a private protocol born on the TCP to the network device to notify the network device to be upgraded, then the network device executes a corresponding upgrade operation after receiving the notification and returns an upgrade result to the network management server through the private protocol born on the TCP.

Specifically, after the network device establishes the TCP connection with the network management server, the network device first transmits device information of the network device itself to the network management server through the private protocol born on the TCP, and the device information may include Media Access Control (MAC) address and device version; the network management server judges the device information transmitted from the network device and transmits upgrade information corresponding to the judgment result to notify the network device to be upgraded, and the upgrade information may include downloading version files, downloading profiles or upgrading profiles; the network device executes a corresponding upgrade operation after receiving the upgrade information and feeds back a corresponding upgrade result to the network management server through the private protocol born on the TCP, and the corresponding upgrade result may include version files or profiles downloading completed or profiles upgrading success, in which, all the upgrade information is the private protocol born on the TCP and corresponds to different types of messages in the private protocol born on the TCP, for example, the network management server notifies is the network device to download version files or profiles, or notifies the network device to upgrade profiles.

In the disclosure, the private protocol includes a plurality of types of messages, which are defined as follows:

```
 0                   1                   2                   3
 0 1 2 3 4 5 6 7 0 1 2 3 4 5 6 7 0 1 2 3 4 5 6 7 0 1 2 3 4 5 6 7
+-+-+-+-+-+-+-+-+-+-+-+-+-+-+-+-+-+-+-+-+-+-+-+-+-+-+-+-+-+-+-+-+
| MSG_TYPE | DATA_NUM |         LENGTH                          |
+-+-+-+-+-+-+-+-+-+-+-+-+-+-+-+-+-+-+-+-+-+-+-+-+-+-+-+-+-+-+-+-+
|                       DATA1_INFO                              |
|                       DATA2_INFO                              |
|                         ......                                |
+-+-+-+-+-+-+-+-+-+-+-+-+-+-+-+-+-+-+-+-+-+-+-+-+-+-+-+-+-+-+-+-+
``` wherein the MSG_TYPE is of one byte, which indicates a message type and can be viewed as a header of the private protocol; for example, when MSG_TYPE=1, the corresponding message is: the network device transmits device information of the network device itself to the network management server; when MSG_TYPE=3, the corresponding message is: the network management server notifies the network device to download version files; of course, the value of the MSG_TYPE and the corresponding message type can be set flexibly; the DATA_NUM is of one byte and indicates the number of data in the current private protocol; the LENGTH is of two bytes and indicates the total length of all data in the current private protocol; the DATA1_INFO, the DATA2_INFO and the like indicate each data in the current private protocol;

wherein the format of the DATA_INFO is defined as follows:

```
 0                   1                   2                   3
 0 1 2 3 4 5 6 7 0 1 2 3 4 5 6 7 0 1 2 3 4 5 6 7 0 1 2 3 4 5 6 7
+-+-+-+-+-+-+-+-+-+-+-+-+-+-+-+-+-+-+-+-+-+-+-+-+-+-+-+-+-+-+-+-+
|DATA_TYPE | DATA_LEN | VALUE_LEN | RESERVED |
+-+-+-+-+-+-+-+-+-+-+-+-+-+-+-+-+-+-+-+-+-+-+-+-+-+-+-+-+-+-+-+-+
|                       DATA_VALUE                              |
+-+-+-+-+-+-+-+-+-+-+-+-+-+-+-+-+-+-+-+-+-+-+-+-+-+-+-+-+-+-+-+-+
``` wherein the DATA_TYPE is of one byte and indicates a data type; the DATA_LEN is of one byte and indicates the length of data; the VALUE_LEN is of one byte and indicates the length of the DATA_VALUE; the RESERVED is of one byte and indicates the alignment reservation of four bytes; the DATA_VALUE indicates the value of data, that is, the content of data, and needs to be complemented to an integral multiple of four bytes. The disclosure defines fourteen types of DATA_TYPEs according to requirements of the upgrade process, as shown in Table 1, and lists the VALUE_LEN, the data type and the data content corresponding to different DATA_TYPEs in Table 1.

TABLE 1

| | VALUE_LEN | DATA_TYPE | Data Content |
|---|---|---|---|
| 1 | 6 | Character String | MAC Address of Network Device |
| 2 | Variable Length | Character String | Version of Network Device |
| 3 | Variable Length | Character String | Type of Network Device |
| 4 | 4 | Integral Type | Identifier is File Transfer Protocol (FTP) or Trivial File Transfer Protocol (TFTP), 0 indicates FTP, 1 indicates TFTP |
| 5 | 4 | Integral Type | FTP/TFTP Server Address |
| 6 | Variable Length | Character String | Path |
| 7 | Variable Length | Character String | File Name |
| 8 | Variable Length | Character String | User Name |
| 9 | Variable Length | Character String | Password |
| 10 | 4 | Integral Type | Execution Result of Downloading Files: 0. Success and Verification Accurate 1. Success but Verification Inaccurate, 2. Failure |
| 11 | 4 | Integral Type | Upgrade Mode: 0. Upgrade Immediately, 1. Upgrade regularly |
| 12 | 19 | Character String | Time Format of Regular Upgrade: yyyy-mm-dd hh:mm:ss |
| 13 | 4 | Integral Type | Execution Result: 0. Success, 1. Failure |
| 14 | 4 | Integral Type | Cyclic Redundancy Check (CRC) | wherein the VALUE_LEN is variable in length and indicates that the value of the VALUE_LEN is the length of the character string corresponding to the DATA_TYPE. Of course, the DATA_TYPE in the disclosure cannot limited to the above fourteen types and can be configured flexibly.

In the disclosure, during the communication process, the network device or the network management device parses the received private protocol born on the TCP, that is, first removes the header to obtain the private protocol and then determines the content of the message according to the MSG_TYPE and the DATA_VALUE of the private protocol; before the network device and the network management device transmits the private protocol to each other, they need to encapsulate a TCP header to the private protocol.

Further, after the network device completes the upgrade in step 102, the network management server notifies the network device to interrupt the TCP connection there-between.

Specifically, after receiving an upgrade success message transmitted from the network device, the network management server notifies the network device to interrupt the TCP connection with the network management server through the private protocol born on the TCP; then the network device interrupts the TCP connection with the network management server after receiving the notification.

Further, during the process of the network device executing an upgrade operation, the network device can report the upgrade progress of the network device itself to the network management server at a regular time, for example, every 30 s, through the private protocol born on the TCP. Here, the upgrade progress can be reported in the form of percentage, for example, 25%, which indicates that the current upgrade progress is at a quarter of the entire upgrade process; or, the current progress is reported in the form of texts directly, for example, downloading version files or profiles in progress.

Figure 2:
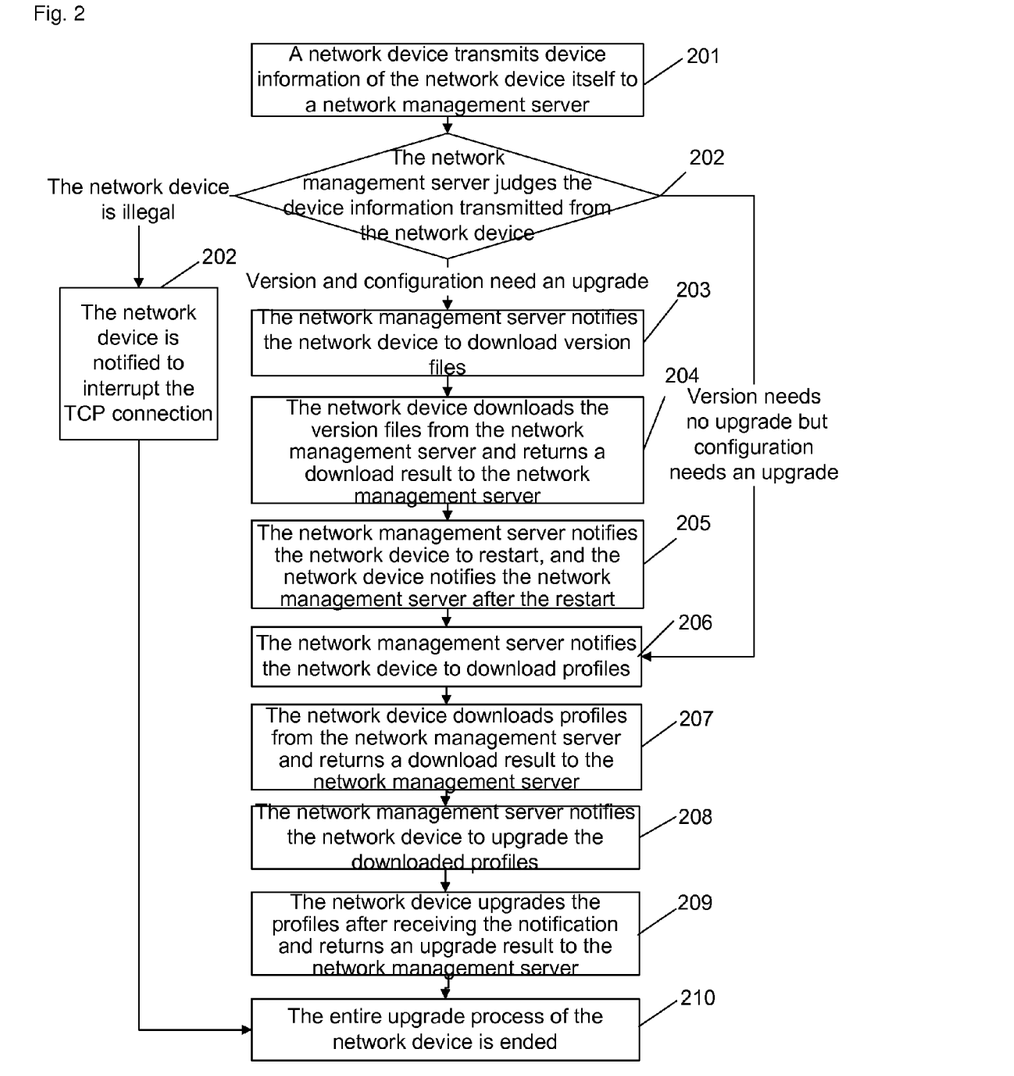
FIG. 2 shows a detailed implementation flowchart for upgrading a network device of the disclosure.

The upgrade process in step 102 is illustrated below in detail in conjunction with the definition of the private protocol and Table 1; as shown in FIG. 2, the process comprises the following implementation steps.

Step 201: a network device transmits device information of the network device itself to a network management server.

Specifically, the network device transmits the device information of the network device itself to the network management server through the private protocol born on the TCP, for example, the device information may include the MAC address of the network device, the version of the network device and the type of the network device.

In step 201, for the private protocol transmitted from the network device, MSG_TYPE=1; DATA_NUM=3; DATA1 corresponds to the first item in Table 1 and denotes the MAC address of the network device; DATA2 corresponds to the second item in Table 1 and denotes the version of the network device; DATA3 corresponds to the third item in Table 1 and denotes the type of the network device. Of course, the DATA_NUM herein is extendable, that is, it can include several kinds of device information.

Step 202: the network management server judges the device information transmitted from the network device; when it is determined that the network device is illegal, the network management server notifies the network device to interrupt the TCP connection; when it is determined that both version and configuration of the network device need an upgrade, step 203 is executed; when it is determined that the version of the network device needs no upgrade but the configuration needs an upgrade, step 206 is executed.

Specifically, after receiving the device information of the network device, the network management server judges the device information transmitted from the network device; when it is determined that the network device is illegal, that is, the network device is not in the control limit of the network management server, the network management server notifies the network device to interrupt the TCP connection with the network management server through the private protocol born on the TCP, and step 210 is executed; when it is determined that the version number and configuration information uploaded by the network device are the same as those specified by the network management server for the network device, step 203 is executed; when it is determined that the version number uploaded by the network device is in accordance with that specified by the network management server for the network device but that the configuration information of the network device is different from that specified by the network management server for the network device, that is, the configuration information is of a lower version than the configuration specified by the network management server, step 206 is executed.

Step 203: the network management server notifies the network device to download version files.

Specifically, the network management server notifies the network device to download, from an FTP/TFTP server of the network management server, the version files needed by upgrade through the private protocol born on the TCP, and notifies the network device to download information such as address, path, file name and password.

Here, for the private protocol transmitted from the network management server, MSG_TYPE=3; DATA_NUM=7; DATA1 corresponds to the fourth item in Table 1 and denotes the type of the FTP/TFTP server, wherein 0 indicates the FTP server and 1 indicates the TFTP server; DATA2 corresponds to the fifth item in Table 1 and denotes the address of the FTP/TFTP server; DATA3 corresponds to the sixth item in Table 1 and denotes the target path of download; DATA4 corresponds to the seventh item in Table 1 and denotes the file name of the version file; DATA5 corresponds to the eighth item in Table 1 and denotes the user name needed by downloading version files; DATA6 corresponds to the ninth item in Table 1 and denotes the password needed by downloading version files; DATA7 corresponds to the fourteenth item in Table 1 and denotes the CRC needed by verification when version files are downloaded, wherein the is DATA_NUM can be extended flexibly.

In the disclosure, the FTP/TFTP server also can be an external independent server managed by the network management server.

Step 204: the network device downloads the version files from the network management server and returns a download result to the network management server.

Specifically, the network device downloads the version files from the FTP/TFTP server after receiving the notification from the network management server and returns the download result to the network management server.

In step 204, for the private protocol transmitted from the network device, MSG_TYPE=5; DATA_NUM=1; DATA1 corresponds to the tenth item in Table 1 and denotes the download result of the version files, wherein 0 indicates download success and verification accurate, 1 indicates download success but verification inaccurate and 2 indicates download failure, wherein the corresponding relationship between 0, 1 or 2 and the download result can be changed flexibly.

Step 205: the network management server notifies the network device to restart; the network device executes a restart operation after receiving the notification and notifies the network management server after the restart.

Specifically, after the network management server receives the download result of the version files returned from the network device and determines that the download and verification are successful, the network management server notifies the network device to restart through the private protocol born on the TCP; the network executes the restart operation after receiving the notification and notifies the network management server after completing the restart. Here, after the network device is restarted, the downloaded version files are upgraded successfully, that is to say, the version of the network device is the latest version after the restart;

wherein for the private protocol transmitted from the network management server, MSG_TYPE=6 and DATA_NUM=0, that is, the protocol dose not include data parameters.

Here, the reason of failure of the download of version files is complex; the specific process method is not included in the scope of protection of the disclosure, and no further description is needed here.

Step 206: the network management server notifies the network device to download profiles.

Specifically, the network management server notifies the network device to download, from the FTP/TFTP server of the network management server, the profiles needed by upgrade through the private protocol born on the TCP, and notifies the network device to download information such as address, path, file name and password.

Here, for the private protocol transmitted from the network management server to notify the network device to download profiles, MSG_TYPE=4; DATA_NUM=7; DATA1 corresponds to the fourth item in Table 1 and denotes the type of the FTP/TFTP server, wherein 0 indicates the FTP server and 1 indicates the TFTP server; DATA2 corresponds to the fifth item in Table 1 and denotes the address of the FTP/TFTP server; DATA3 corresponds to the sixth item in Table 1 and denotes the target path of download; DATA4 corresponds to the seventh item in Table 1 and denotes the file name of the profile; DATA5 corresponds to the eighth item in Table 1 and denotes the user name needed by downloading profiles; DATA6 corresponds to the ninth item in Table 1 and denotes the password needed by downloading profiles; DATA7 corresponds to the fourteenth item in Table 1 and denotes the CRC needed by verification when profiles are downloaded, wherein the DATA_NUM can be extended flexibly.

Step 207: the network device downloads profiles from the network management server and returns a download result to the network management server.

Specifically, the network device downloads the profiles from the FTP/TFTP server after receiving the notification from the network management server and returns the download result to the network management server.

In step 207, for the private protocol transmitted from the network device, MSG_TYPE=7; DATA_NUM=1; DATA1 corresponds to the tenth item in Table 1 and is denotes the result of downloading the profiles, wherein 0 indicates download success and verification accurate, 1 indicates download success but verification inaccurate and 2 indicates download failure, wherein the corresponding relationship between 0, 1 or 2 and the download result can be changed flexibly.

Step 208: the network management server notifies the network device to upgrade the downloaded profiles.

Specifically, after the network management server determines that the network device has successfully downloaded the profiles, the network management server notifies the network device to upgrade the downloaded profiles through the private protocol born on the TCP, wherein the upgrade mode includes upgrade immediately and upgrade regularly. Here, the reason of failure of the download of profiles is complex; the specific process method is not included in the scope of protection of the disclosure, and no further description is needed here.

Here, for the private protocol transmitted from the network management server, MSG_TYPE=8; DATA_NUM=1 or 2; if the upgrade mode is upgrade immediately, DATA_NUM=1, DATA1 corresponds to the eleventh item in Table 1 and denotes the upgrade mode, that is, 0 indicates upgrade immediately; if the upgrade mode is upgrade regularly, DATA_NUM=2, DATA1 corresponds to the eleventh item in Table 1 and denotes the upgrade mode, that is, 1 indicates that the upgrade mode is upgrade regularly; DATA2 corresponds to the twelfth item in Table 1 and denotes the time of regular upgrade.

Step 209: the network device upgrades the profiles after receiving the notification and returns an upgrade result to the network management server.

Here, for the private protocol transmitted from the network device, MSG_TYPE=9; DATA_NUM=1; DATA1 corresponds to the thirteenth item in Table 1 and denotes the upgrade result of the profiles, wherein 0 indicates upgrade success and 1 indicates upgrade failure.

Step 210: the entire upgrade process of the network device is ended.

In step 208, if the involved upgrade mode is upgrade immediately, the following step is set between step 209 and step 210: the network management server notifies the network device to upload log files, that is, upload files corresponding to the upgrade result of the profiles, then the network device uploads the log files to the FTP/TFTP serer after receiving the notification and transmits an upload result to the network management server.

Here, for the private protocol transmitted from the network management server to notify the network device to upload logs, MSG_TYPE=10; DATA_NUM=6; DATA1 corresponds to the fourth item in Table 1 and denotes the type of the FTP/TFTP server, wherein 0 indicates the FTP server and 1 indicates the TFTP server; DATA2 corresponds to the fifth item in Table 1 and denotes the address of the corresponding FTP/TFTP server to which the log files are uploaded; DATA3 corresponds to the sixth item in Table 1 and denotes the target path of upload; DATA4 corresponds to the seventh item in Table 1 and denotes the file name of the log file; DATA5 corresponds to the eighth item in Table 1 and denotes the user name needed by uploading log files; DATA6 corresponds to the ninth item in Table 1 and denotes the password needed by uploading log files, wherein the DATA_NUM can be extended flexibly.

For the private protocol used by the network device to upload the upgrade result, MSG_TYPE=11; DATA_NUM=1; and DATA1 corresponds to the thirteenth item in Table 1 and denotes the upload result of the log files, wherein 0 indicates upload success and 1 indicates upload failure.

When the upgrade mode is upgrade regularly and after the network device completes the upgrade, if the TCP connection between the network management server and the network device is not interrupted, the network management server still can notify the network device to upload log files through the existing TCP connection; then the network device uploads the log files to the FTP/TFTP server after receiving the notification and transmits the upload result to the network management server through the existing TCP connection; if the TCP connection between the network management server and the network device has been interrupted, the network management server is can notify the network device to upload log files by other means; then the network device transmits the upload result to the network management server by other means. The other means can be that: the network management server notifies the network device to upload log files by transmitting other remote control protocols such as User Diagram Protocol (UDP), and then the network device transmits the upload result of the log files to the network management server through the UDP.

Further, after step 210, the network management server notifies the network device to interrupt the TCP connection; then the network device interrupts the TCP connection with the network management server after receiving the notification.

Specifically, after the network management server receives the upgrade result of the profiles transmitted from the network device and determines the success of the upgrade, the network management server notifies the network device to interrupt the TCP connection through the private protocol born on the TCP; and then the network device interrupts the TCP connection with the network management server after receiving the notification.

Here, for the private protocol transmitted from the network management server, MSG_TYPE=2 and DATA_NUM=0, that is, the protocol dose not include data parameters.

Figure 3:
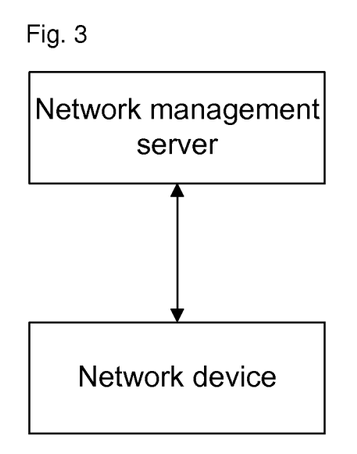
FIG. 3 shows a structure diagram of a system for upgrading a network device of the disclosure.

In order to implement the method above, the disclosure also provides a system for upgrading a network device; as shown in FIG. 3, the system comprises a network management server and a network device;

the network management server is configured to: establish a TCP connection with the network device; during an upgrade process, transmit a private protocol born on the TCP to the network device to notify the network device to be upgraded; and receive an upgrade result of the execution of a corresponding upgrade operation returned by the network device through the private protocol born on the TCP;

the network device is configured to: establish a TCP connection with the network management server; during an upgrade process, after receiving an upgrade notification transmitted from the network management server through the private is protocol born on the TCP, execute a corresponding upgrade operation and return an upgrade result to the network management server through the private protocol born on the TCP;

Preferably, the network management server is configured to notify, after the network device completes the upgrade, the network device to interrupt the TCP connection there-between through the private protocol born on the TCP; and the network device is configured to execute a disconnection operation of the TCP connection after receiving the notification transmitted from the network management server.

Preferably, the network device is configured to regularly report the upgrade progress of the network device itself to the network management server through the private protocol born on the TCP, during the upgrade process; and the network management server is configured to receive the upgrade progress transmitted from the network device.

The upgrade process in which the network management server performs communications with the network device by using the private protocol born on the TCP specifically includes:

the network management server receives and judges device information transmitted from the network device, transmits upgrade information corresponding to the judgment result to notify the network device to be upgraded, and receives a corresponding upgrade result fed back by the network device; and the upgrade process in which the network device performs communications with the network management server by using the private protocol born on the TCP specifically includes:

the network device transmits device information of the network device itself to the network management server, executes a corresponding upgrade operation after receiving upgrade information transmitted from the network management server and feeds back a corresponding upgrade result to the network management server.

The network management server judging the device information transmitted from the network device, transmitting the upgrade information corresponding to the judgment result to notify the network device to be upgraded and receiving the corresponding upgrade result fed back by the network device specifically includes:

judging the device information transmitted from the network device, notifying the network device to interrupt the TCP connection when determining that the network device is illegal; notifying the network device to download version files when determining that both version and configuration of the network device need an upgrade; notifying the network device to directly download profiles when determining that the version of the network device needs no upgrade but the configuration needs an upgrade;

notifying the network device to restart after receiving a download result of the version files transmitted from the network device, and receiving a restart complete result reported by the network device; notifying the network device to upgrade the downloaded profiles after receiving a download result of the profiles transmitted from the network device, and receiving an upgrade result of the profiles returned by the network device.

The network device executing the corresponding upgrade operation after receiving the upgrade information transmitted from the network management server and feeding back the corresponding upgrade result to the network management server specifically includes:

after being determined to be illegal by the network management server and receiving a notification of interrupting the TCP connection, interrupting the TCP connection with the network management server; after receiving the notification from the network management server, downloading version files or downloading profiles, and returning a download result to the network management server; after receiving the notification from the network management server, restarting and notifying the network management server after the restart; and after receiving the notification from the network management server, upgrading the profiles and returning an upgrade result to is the network management server.

The upgrade mode of the network device upgrading profiles notified by the network management server includes: upgrade immediately and upgrade regularly; when the upgrade mode is the upgrade immediately, preferably, the network management server is configured to notify the network device to upload log files after receiving the upgrade result of the profiles transmitted from the network device and to receive an upload result of the log files transmitted from the network device; and the network device is configured to upload the log files after receiving the notification transmitted from the network management server and to transmit the upload result to the network management server.

The above are only the preferred embodiments of the disclosure and are not intended to limit the scope of protection of the disclosure. Any modification, equivalent substitute and improvement made within the spirit and principle of the disclosure are deemed to be included within the scope of protection of the disclosure.

What is claimed is:

1. A method for upgrading a network device, comprising:
   establishing, by a network management server, a Transmission Control Protocol (TCP) connection with the network device;
   during an upgrade process, transmitting, by the network management server, a private protocol born on the TCP to the network device to notify the network device to be upgraded; executing, by the network device, a corresponding upgrade operation after receiving the notification and returning an upgrade result to the network management server through the private protocol born on the TCP;
   wherein the process of the network management server and the network device performing an upgrade by using the private protocol born on the TCP comprises:
   step A: transmitting, by the network device, device information of the network device itself to the network management server;
   step B: judging, by the network management server, the device information transmitted from the network device and transmitting upgrade information corresponding to the judgment result to notify the network device to be upgraded;
   step C: executing, by the network device, a corresponding upgrade operation after receiving the upgrade information and feeding back an upgrade result to the network management server;
   wherein the step B comprises: judging, by the network management server, the device information transmitted from the network device, notifying the network device to interrupt the TCP connection when determining that the network device is illegal, notifying the network device to download version files when determining that both version and configuration of the network device need an upgrade, and notifying the network device to directly download profiles when determining that the version of the network device needs no upgrade but the configuration needs an upgrade;
   the step C comprises: when receiving the notification from the network management server of downloading version files, downloading, by the network device, the version files and returning a download result to the network management server;
   notifying, by the network management server, the network device to restart, then executing, by the network device, a restart operation after receiving the notification and notifying the network management server after the restart;
   when receiving the notification from the network management server of downloading profiles, downloading, by the network device, the profiles and returning a download result to the network management server; notifying, by the network management server, the network device to upgrade the downloaded profiles, then upgrading, by the network device, the profiles after receiving the notification and returning an upgrade result to the network management server.

2. The method according to claim 1, wherein the upgrade mode of the network device upgrading profiles notified by the network management server comprises:
   upgrade immediately and upgrade regularly;
   when the upgrade mode is upgrade immediately, after the network device returns the upgrade result of the profiles to the network management server, the method further comprising:
   notifying, by the network management server, the network device to upload log files, then uploading, by the network device, the log files after receiving the notification and transmitting an upload result to the network management server.

3. The method according to claim 1, further comprising:
   after the network device completes the upgrade,
   notifying, by the network management server, the network device to interrupt the TCP connection there-between through the private protocol born on the TCP; executing, by the network device, a disconnection operation of the TCP connection after receiving the notification.

4. The method according to claim 1, further comprising:
   during the upgrade process of the network device,
   regularly reporting, by the network device, the upgrade progress of the network device itself to the network management server through the private protocol born on the TCP.

5. The method according to claim 1, further comprising:
   after the network device completes the upgrade, notifying, by the network management server, the network device to interrupt the TCP connection there-between through the private protocol born on the TCP;
executing, by the network device, a disconnection operation of the TCP connection after receiving the notification.

6. The method according to claim 1, further comprising: during the upgrade process of the network device, regularly reporting, by the network device, the upgrade progress of the network device itself to the network management server through the private protocol born on the TCP.

7. The method according to claim 1, further comprising: during the upgrade process of the network device, regularly reporting, by the network device, the upgrade progress of the network device itself to the network management server through the private protocol born on the TCP.

8. The method according to claim 2, further comprising: during the upgrade process of the network device,
regularly reporting, by the network device, the upgrade progress of the network device itself to the network management server through the private protocol born on the TCP.

9. A system for upgrading a network device, comprising: a network management server and a network device;
the network management server is configured to: establish a TCP connection with the network device; during an upgrade process, transmit a private protocol born on the TCP to the network device to notify the network device to be upgraded; and receive an upgrade result of the execution of an upgrade operation returned by the network device through the private protocol born on the TCP;
the network device is configured to: establish a TCP connection with the network management server; during an upgrade process, after receiving an upgrade notification transmitted from the network management server through the private protocol born on the TCP, execute a corresponding upgrade operation and return an upgrade result to the network management server through the private protocol born on the TCP;
wherein the upgrade process in which the network management server performs communications with the network device by using the private protocol born on the TCP comprises: the network management server receives and judges device information transmitted from the network device, transmits upgrade information corresponding to the judgment result to notify the network device to be upgraded, and receives an upgrade result fed back by the network device; and
the upgrade process in which the network device performs communications with the network management server by using the private protocol born on the TCP comprises: the network device transmits device information of the network device itself to the network management server, executes a corresponding upgrade operation after receiving upgrade information transmitted from the network management server and feeds back an upgrade result to the network management server; and
wherein the network management server judging the device information transmitted from the network device, notifying the network device to be upgraded and receiving the upgrade result fed back by the network device comprises:
judging the device information transmitted from the network device, notifying the network device to interrupt the TCP connection when determining that the network device is illegal; notifying the network device to download version files when determining that both version and configuration of the network device need an upgrade;
notifying the network device to directly download profiles when determining that the version of the network device needs no upgrade but the configuration needs an upgrade;
notifying the network device to restart after receiving a download result of the version files transmitted from the network device, and receiving a restart complete result reported by the network device; notifying the network device to upgrade the downloaded profiles after receiving a download result of the profiles transmitted from the network device, and receiving an upgrade result of the profiles returned by the network device; and
the network device executing the upgrade operation and feeding back the upgrade result to the network management server comprises:
after being determined to be illegal by the network management server and receiving a notification of interrupting the TCP connection, interrupting the TCP connection with the network management server; after receiving the notification from the network management server, downloading version files or downloading profiles, and
returning a download result to the network management server; after receiving the notification from the network management server, restarting and notifying the network management server after the restart; and after receiving the notification from the network management server, upgrading the profiles and returning an upgrade result to the network management server.

10. The system according to claim 9, wherein the upgrade mode of the network device upgrading profiles notified by the network management server comprises:
upgrade immediately and upgrade regularly;
when the upgrade mode is upgrade immediately, the network management server is further configured to notify the network device to upload log files after receiving the upgrade result of the profiles transmitted from the network device and to receive an upload result of the log files transmitted from the network device; and
the network device is further configured to upload the log files after receiving the notification transmitted from the network management server and to transmit the upload result to the network management server.

11. The system according to claim 9, wherein the network management server is further configured to notify, after the network device completes the upgrade, the network device to interrupt the TCP connection there-between through the private protocol born on the TCP; and
the network device is further configured to execute a disconnection operation of the TCP connection after receiving the notification transmitted from the network management server.

12. The system according to claim 9, wherein the network device is further configured to regularly report the upgrade progress of the network device itself to the network management server through the private protocol born on the TCP, during the upgrade process; and
the network management server is further configured to receive the upgrade progress transmitted from the network device.

13. The system according to claim 10, wherein the network management server is further configured to notify, after the network device completes the upgrade, the network device to interrupt the TCP connection there-between through the private protocol born on the TCP; and     the network device is further configured to execute a disconnection operation of the TCP connection after receiving the notification transmitted from the network management server.

14. The system according to claim 9, wherein the network device is further configured to regularly report the upgrade progress of the network device itself to the network management server through the private protocol born on the TCP, during the upgrade process; and     the network management server is further configured to receive the upgrade progress transmitted from the network device.

15. The system according to claim 9, wherein the network device is further configured to regularly report the upgrade progress of the network device itself to the network management server through the private protocol born on the TCP, during the upgrade process; and     the network management server is further configured to receive the upgrade progress transmitted from the network device.

16. The system according to claim 10, wherein the network device is further configured to regularly report the upgrade progress of the network device itself to the network management server through the private protocol born on the TCP, during the upgrade process; and     the network management server is further configured to receive the upgrade progress transmitted from the network device.

* * * * *